Patented Mar. 7, 1939

2,150,137

UNITED STATES PATENT OFFICE 2,150,137

ALPHA-ETHYL BETA-PROPYL ACROLEIN RESINS

Lloyd C. Swallen, Pekin, Ill., assignor to Resinox Corporation, New York, N. Y., a corporation of Delaware No Drawing. Application September 27, 1937, Serial No. 165,904

11 Claims. (Cl. 260—55)

My invention relates to new synthetic resins and more particularly to condensation products of phenols and alpha-ethyl beta-propyl acrolein, and resins produced by the further condensation of such products with saturated aldehydes.

I have found that highly satisfactory resinous materials may be produced by reacting a phenol with alpha-ethyl beta-propyl acrolein in the presence of a condensation catalyst. Alpha-ethyl beta-propyl acrolein is a hitherto unused by-product of certain chemical processes, and thus constitutes a very desirable raw material from an economic standpoint.

I have further discovered that by reacting a saturated aldehyde, preferably a reactive methylene compound, with a fusible non-reactive initial condensation product of a phenol and alpha-ethyl beta-propyl acrolein other desirable types of resinous products may be produced. By employing specific ratios of aldehyde to initial condensation product, oil-soluble resins are obtainable which possess a combination of characteristics particularly suited for varnish use. These products constitute somewhat dark colored plastics which are readily soluble in drying oils and mixtures of drying oils and the common varnish diluents, and which possess the requisite hardness and other desired properties of oil-soluble resins for use in varnish and similar compositions.

In carrying out my invention a mixture of alpha-ethyl beta-propyl acrolein and phenol, or a homologue thereof, together with a condensation catalyst is heated for a period of hours to effect resinification. I prefer to employ a molecular excess of the phenol in order to secure a fusible resin, but useful products are obtainable over a wide range of proportion of the initial reactants. The reaction temperature is not critical, but should not be unduly high in order to avoid decomposition and in order to control the reaction more readily if heat reactive products are to be produced. Temperatures from 60 to 120° C. are satisfactory and the reaction may suitably be effected at the reflux temperature of the mixture. Either acid or alkaline condensation catalysts may be employed, the alkaline catalysts being more advantageous from the standpoint of producing a lighter colored product. A further improvement in the color of the resin may be effected by carrying out the reaction in a non-oxidizing atmosphere. The time of reaction will depend upon the temperature and upon the proportion of the reactants, and the course of the reaction may be followed by determining at intervals the melting point of the product. At the conclusion of the reaction the catalyst may be removed by neutralizing and washing, and any unreacted materials may then be removed by steam distillation.

The resinous products produced as described above may be utilized for any purposes for which similar resins are employed in the arts. If fusible non-reactive resins are produced these may be further reacted with saturated aldehydes to produce infusible resins, or other modified forms of the original resin. Oil-soluble resins suitable for varnish purposes may be produced by reacting a fusible non-reactive initial condensation product with specified proportions of formaldehyde or equivalent reactive methylene compound.

In the production of oil-soluble resins the initial condensation product obtained as described above, by the reaction of alpha-ethyl beta-propyl acrolein with a molecular excess of a phenol, is reacted with from 3% to 7% by weight of formaldehyde (dry basis), and preferably with about 5% by weight of formaldehyde, or an equivalent amount of other reactive methylene compound. This reaction is carried out at elevated temperatures with or without a condensation catalyst. If an aqueous solution of formaldehyde is employed the reaction may suitably be effected at the reflux temperature of the mixture, or if a solid polymer of formaldehyde is used the reaction may be carried out at temperatures of 100 to 140° C. The course of the reaction may be followed by determining the melting point of the product, which will reach a maximum at the conclusion of the reaction. The melting point of the resin will depend upon the exact proportion of the reactants but may range from about 80° C. to about 120° C., the preferred melting point for varnish purposes being approximately 100° C.

The products prepared as described above constitute resins which are readily soluble in drying oils, or in mixtures of drying oils and the common varnish diluents. These products are somewhat dark in color if prepared from the acid catalyzed initial condensation product, and relatively light in color if prepared from an intial condensation product reaction in the absence of oxygen and in the presence of an alkaline catalyst. It is apparent that the former type may suitably be employed in dark enamels and in varnishes in which a somewhat dark color is not a deterrent, and that the latter type may be satisfactorily employed in the preparation of light varnishes and enamels.

The following specific examples illustrate resins made in accordance with my invention, and varnishes prepared from the oil-soluble type resins.

Example I

A mixture comprising 95 parts by weight of alpha-ethyl beta-propyl acrolein, 150 parts of phenol (80%), and 20 parts of concentrated hydrochloric acid was heated for 24 hours at 80° C. At the end of this time the acid layer was separated and 10 parts by weight of fresh hydrochloric acid was added. After a further reaction time of 6 hours at 80° C. the acid layer was again separated, and the resin layer was steam distilled at an elevated temperature to remove any unreacted material or other volatile compound. A yield of 160 parts by weight of a relatively dark colored resin was obtained.

Example II

A mixture comprising 120 parts by weight of alpha-ethyl beta-propyl acrolein, 180 parts of phenol and 25 parts of concentrated hydrochloric acid was heated for 48 hours at 80° C. and then steam distilled at an elevated temperature to remove excess reactants. A yield of 185 parts of intermediate reaction product was thus obtained. 150 parts of this intermediate was then mixed with 30 parts by weight of 35% formaldehyde and refluxed for 16 hours after which the mass was heated to 200° C. in approximately 1½ hours. The resulting product was a relatively dark colored resin having a soften-point of 99° C. and a specific gravity of 1.06.

A varnish was prepared from the above resin by cooking 25 parts of the resin in 50 parts by weight of China-wood oil at 280 to 290° C. for 11 minutes and then thinning with an equal weight of toluol and incorporating a drier containing 0.05 part cobalt, 0.05 part manganese and 0.08 part lead. The resulting varnish was found to have a satisfactory combination of varnish properties including a naphtha tolerance of 3.0, a drying time of 3½ hours, and a film hardness F (Wilkinson Pencil Test) after 4 days drying time.

Example III

A mixture of 2652 parts by weight of 80% phenol, redistilled, 1326 parts alpha-ethyl beta-propyl acrolein, and 133 parts sodium hydroxide was refluxed for 22 hours in an apparatus fitted with reflux condensers and water traps, the air having been displaced from the apparatus by nitrogen. At the conclusion of the refluxing, sufficient benzol was added to make the product fluid enough to wash, and the mixture was acidified by adding 250 parts by weight of concentrated hydrochloric acid and sufficient acetic acid to make the material slightly acid. The material was then washed with water until neutral to methyl red after which it was steam distilled at an elevated temperature to remove unreacted materials. A yield of 2030 parts by weight of a relatively light colored resin was thus obtained.

A mixture of 500 parts by weight of the condensation prepared as above described, 25 parts of paraform, and 3.5 parts of oxalic acid was heated for four hours on a steam bath and then transferred to a varnish kettle and heated rapidly to 200° C. The resulting product was a resin of softening point of 102° C., having a much lighter color than the resin of the preceding example.

A varnish was prepared from the above resin by cooking the resin in China-wood oil, in a ratio of 100 pounds of the resin to 12½ gallons of oil, for 35 minutes at 235 to 245° C. and thinning with oleum spirits to the desired application viscosity. The resulting varnish was found to have an excellent combination of properties including a drying time of 3 hours, satisfactory hardness, adhesion and durability, and excellent resistance to alkali and boiling water. In the application of this varnish the original film drys to a somewhat darker color than would be expected but bleaches within a matter of a few days to a color which is satisfactory for most varnish uses.

It will be understood, of course, that the above examples are merely illustrative and do not limit the scope of my invention. Numerous equivalent materials may be substituted for the materials specified in these examples and the procedures employed may be modified in various respects. In place of phenol, other phenolic bodies such as ortho, meta, or paracresol, the xylenols, or mixtures of these materials, may be employed. In the initial reaction between the alpha-ethyl beta-propyl acrolein and the phenol other condensation catalysts may be employed in place of those specified in the examples, e. g., phosphoric acid, potassium hydroxide, calcium hydroxide, etc., and other ratios of reactants may be employed depending upon the nature of the product desired. If a fusible non-reactive reaction product is to be reacted with aldehyde to produce a modified resin, this reaction may be carried out either with or without a condensation catalyst, and various other catalysts of this nature may be substituted for the oxalic acid specified in Example III. Various aldehydes may be substituted for formaldehyde in this reaction as, for example, acetaldehyde, propionaldehyde, hexamethylenetetramine, etc. The proportion of the reactants may vary over a considerable range depending on the nature of the product desired, but for the production of oil-soluble products the ratio should be maintained within the range previously specified. Various other modifications of procedure and equivalent materials will naturally occur to those skilled in the art, and it is to be understood that these are included within the scope of my invention.

My invention now having been described, what I claim is:

1. A synthetic resin comprising a condensation product of a mixture consisting essentially of alpha-ethyl beta-propyl acrolein and a phenol.

2. A synthetic resin comprising a fusible, non-reactive condensation product of a mixture consisting essentially of alpha-ethyl beta-propyl acrolein and phenol.

3. A synthetic resin comprising a condensation product of a saturated aldehyde with the reaction product of a mixture consisting essentially of alpha-ethyl beta-propyl acrolein and a phenol.

4. A synthetic resin comprising a condensation product of a reactive methylene compound with the reaction product of a mixture consisting essentially of alpha-ethyl beta-propyl acrolein and a phenol.

5. A synthetic resin comprising a condensation product of formaldehyde with the reaction product of a mixture consisting essentially of alpha-ethyl beta-propyl acrolein and phenol.

6. A synthetic resin comprising an oil-soluble condensation product of an amount of a reactive methylene compound equivalent to 3% to 7% by weight of formaldehyde (dry basis) with a fusible, non-reactive reaction product of alpha-ethyl beta-propyl acrolein and a molecular excess of a phenol in the presence of a condensation catalyst.

7. A synthetic resin comprising an oil-soluble condensation product of approximately 5% by weight of formaldehyde (dry basis) with the fusible, non-reactive reaction product of a mixture consisting essentially of alpha-ethyl beta-propyl acrolein and a molecular excess of phenol.

8. A process for the production of synthetic resins which comprises reacting a mixture consisting essentially of alpha-ethyl beta-propyl acrolein and a phenol in the presence of a condensation catalyst.

9. A process for the production of synthetic resins which comprises reacting a mixture consisting essentially of alpha-ethyl beta-propyl acrolein and a phenol in the presence of a condensation catalyst, and further reacting the condensation product thus produced with a saturated aldehyde.

10. A process for the production of oil-soluble synthetic resins which comprises reacting alpha-ethyl beta-propyl acrolein with a molecular excess of a phenol in the presence of a condensation catalyst, and further reacting the condensation product thus produced with an amount of a reactive methylene compound equivalent to 3% to 7% by weight of formaldehyde (dry basis).

11. A process for the production of oil-soluble synthetic resins which comprises reacting a mixture consisting essentially of alpha-ethyl beta-propyl acrolein and a molecular excess of phenol in the presence of a condensation catalyst, and further reacting the condensation product thus produced with approximately 5% by weight of formaldehyde (dry basis).

LLOYD C. SWALLEN.